United States Patent
Sharma et al.

(10) Patent No.: US 10,572,324 B2
(45) Date of Patent: Feb. 25, 2020

(54) INTELLIGENT LISTENING SYSTEM FOR AGILE DELIVERY OF CLOUD SERVICES

(71) Applicant: Microsoft Technology Licensing, LLC, Redmond, WA (US)

(72) Inventors: Esha Sharma, Bellevue, WA (US); Donovan A. Isaak, Kenmore, WA (US); Vadi Ramalingam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 342 days.

(21) Appl. No.: 15/395,201

(22) Filed: Dec. 30, 2016

(65) Prior Publication Data

US 2018/0074877 A1   Mar. 15, 2018

Related U.S. Application Data

(60) Provisional application No. 62/393,361, filed on Sep. 12, 2016.

(51) Int. Cl.
*G06F 11/00* (2006.01)
*G06F 11/07* (2006.01)

(52) U.S. Cl.
CPC ...... *G06F 11/0709* (2013.01); *G06F 11/0775* (2013.01)

(58) Field of Classification Search
CPC ........... G06F 11/0709; G06F 11/0772; G06F 11/076; G06F 11/0739; G06F 11/0775
USPC ........................................................ 714/38.1
See application file for complete search history.

(56) References Cited

U.S. PATENT DOCUMENTS

| | | |
|---|---|---|
| 6,445,782 B1 | 9/2002 | Elfe et al. |
| 9,053,231 B2 | 6/2015 | Agrawal et al. |
| 9,177,141 B2 | 11/2015 | Zhou et al. |
| 9,189,224 B2 | 11/2015 | Ravi |
| 9,245,117 B2 | 1/2016 | Weaver et al. |
| 9,367,289 B2 | 6/2016 | Abrahams et al. |
| 2008/0269921 A1 | 10/2008 | Banerji et al. |
| 2010/0131193 A1 | 5/2010 | Shnyr |
| 2010/0146325 A1* | 6/2010 | John ............... G06F 11/0793 714/3 |
| 2011/0320876 A1* | 12/2011 | Klein ................. G06F 8/33 714/38.1 |

(Continued)

FOREIGN PATENT DOCUMENTS

| | | |
|---|---|---|
| WO | 2014165967 A1 | 10/2014 |
| WO | 2016069421 A1 | 5/2016 |

OTHER PUBLICATIONS

Wikipedia "operand" page, retrieved from https://en.wikipedia.org/wiki/Operand (Year: 2018).*

(Continued)

*Primary Examiner* — Yair Leibovich
(74) *Attorney, Agent, or Firm* — Christopher J. Volkmann; Kelly, Holt & Christenson, PLLC

(57) ABSTRACT

A support data generation system detects an indication of a problem within a flighted infrastructure. Based on the detected indication, a feature undergoing implementation within the flighted infrastructure is identified. The identification occurs automatically after the indication is detected. An alert comprises the detected indication and the identified feature is generated and output on a user interface.

17 Claims, 14 Drawing Sheets

(56) References Cited

U.S. PATENT DOCUMENTS

| | | | | |
|---|---|---|---|---|
| 2013/0290234 | A1* | 10/2013 | Harris | G06N 5/022 706/46 |
| 2014/0336791 | A1 | 11/2014 | Asenjo et al. | |
| 2015/0003595 | A1* | 1/2015 | Yaghi | G06Q 10/063 379/85 |
| 2015/0178349 | A1* | 6/2015 | Niewodniczanski | G06F 17/30424 707/722 |
| 2016/0048383 | A1 | 2/2016 | Nachimuthu et al. | |
| 2016/0292403 | A1* | 10/2016 | Gong | H04L 63/101 |
| 2018/0062918 | A1* | 3/2018 | Celikyilmaz | H04L 67/34 |

OTHER PUBLICATIONS

Wikipedia "Bug tracking system" page from Jun. 24, 2016, retrieved using the WayBackMachine from https://web.archive.org/web/20160624002923/https://en.wikipedia.org/wiki/Bug_tracking_system (Year: 2016).*

Wikipedia "Patch (computing)" page from Jun. 24, 2016, retrieved using the WayBackMachine from https://web.archive.org/web/20160624011952/https://en.wikipedia.org/wiki/Patch_%28computing%29#expand (Year: 2016).*

Wikipedia "Cloud computing" page of date Sep. 11, 2016 retrieved from https://web.archive.org/web/20160911012416/https://en.wikipedia.org/wiki/Cloud_computing (Year: 2017).*

Wikipedia "Memory buffer register" page retrieved from https://en.wikipedia.org/wiki/Memory_buffer_register (Year: 2019).*

"Top Customer Service Software Products", Retrieved on: Sep. 2, 2016 Available at: http://www.capterra.com/customer-service-software/.

"Feature Details", Published on: Oct. 16, 2012 Available at: http://www.webhelpdesk.com/help-desk-software/feature-comparison.

* cited by examiner

INTELLIGENT LISTENING SYSTEM FOR AGILE DELIVERY OF CLOUD SERVICES

CROSS-REFERENCE TO RELATED APPLICATIONS

The present application is based on and claims the benefit of U.S. Provisional Patent Application Ser. No. 62/393,361 filed Sep. 12, 2016, the content of which application is hereby incorporated by reference in its entirety.

BACKGROUND

Today, many cloud based systems rely on a flighting infrastructure to deliver innovation to cloud customers in the most agile manner. The speed at which each new feature is deployed is controlled by the feature flight. As the scope of a flight is increased, problems must be detected early enough to prevent the release of a faulty feature to more customers. For a typical product issue to be reported to feature teams, it can currently take weeks or even months. In that time, the scope of the feature flight will be expanded to an increasing proportion of a cloud-based system's customers.

The discussion above is merely provided for general background information and is not intended to be used as an aid in determining the scope of the claimed subject matter.

SUMMARY

A support data generation system detects an indication of a problem within a flighted infrastructure. Based on the detected indication, a feature undergoing implementation within the flighted infrastructure is identified. The identification occurs automatically after the indication is detected. An alert comprises the detected indication and the identified feature is generated and output on a user interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

DETAILED DESCRIPTION

Figure 1:
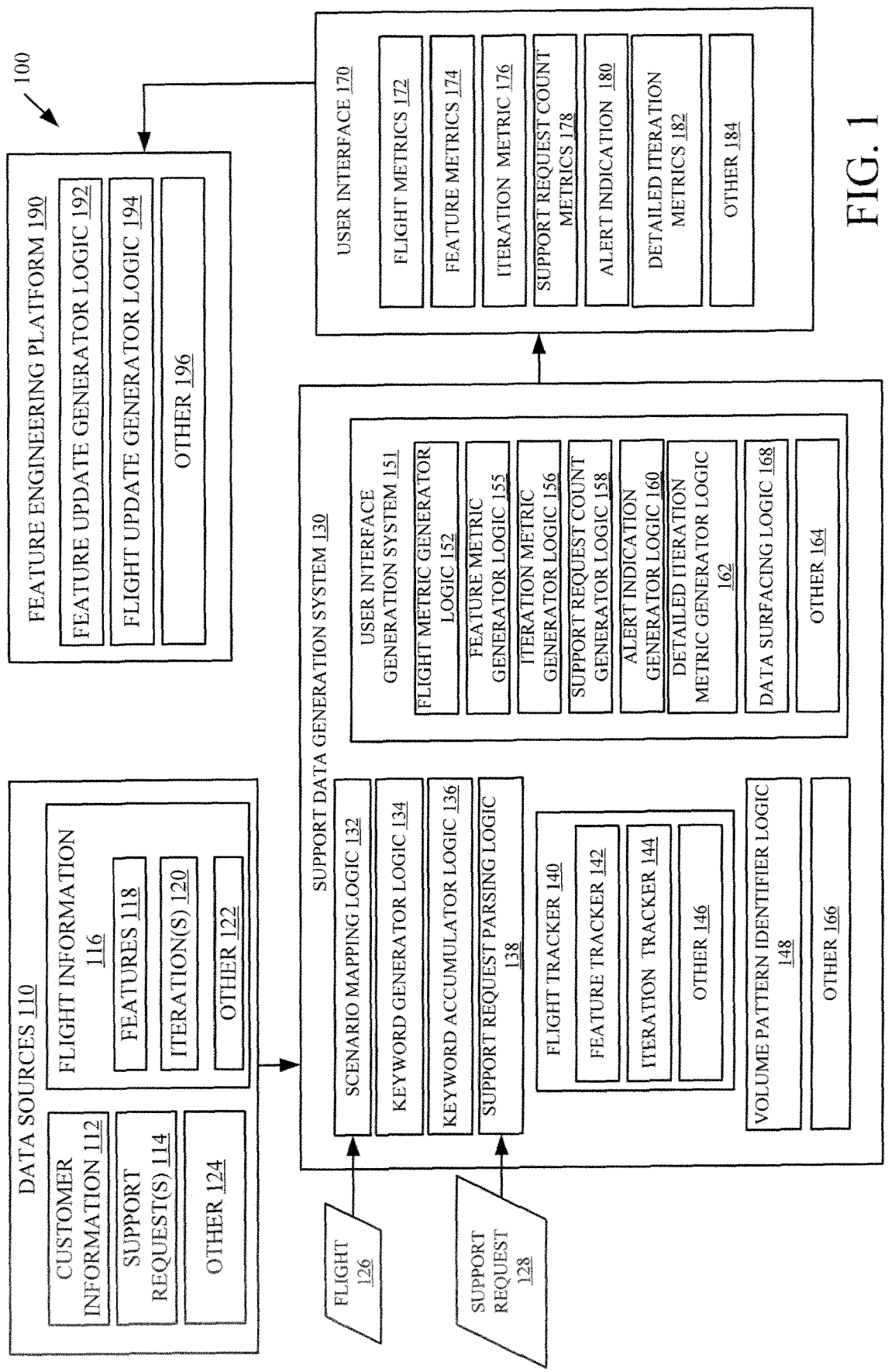
FIG. 1 is a block diagram showing a product engineering environment deployed in a cloud computing environment.

FIG. 1 is a block diagram showing a product engineering environment 100 deployed in a cloud computing environment. Product engineering environment 100 illustratively includes one or more data sources 110. Data sources 110 are illustrated in FIG. 1 as being stored within a common database. However, it is expressly contemplated that data sources are, in other examples, stored separate from one another and, for example, accessed remotely through a cloud computing network. A product engineering environment 100 can comprise, for example, a software program or interface where a product engineer can make changes to, or create new, product offerings.

Data sources 110 include, for example, flight information 116. New feature releases of a computing system generated in a product engineering environment and then can be combined and deployed to new customers in different flights. Flight information 116 can comprise, for example, one or more features 118, iteration details 120, and other information. Iteration details 120 can include, for example, a release scope of each iteration of a flight release. Flight information 116 can also include other information, such as keywords or customer scenarios related to a given feature 118 within a flight. At the creation of new feature 118, one or more customer scenarios can be mapped to each feature 118 by a developer. After a new feature flight is created, this scenario mapping and the current state of feature flights is stored automatically and dynamically. Dynamically comprises, for example, mapping scenarios and feature flights as they are created. Also, as used herein, automatically means the action is performed without further user involvement, except, perhaps to initiate or authorize the action.

Data sources 110 also include, in one example, customer information 112. Customer information 112 includes information identifying customers that will use at least some of the features developed in the product engineering environment. Customer information 112 can include customer names, and priority (e.g. early release, beta testers or late release, etc.). Customer information 112 can also include information on products and features a customer has purchased, accessed, and/or submitted support requests for. Customer information 112 can also indicate whether a customer was included in a previous iteration 120 of a specific flight. Development teams, in addition to receiving details of a support request 114, can also receive an identity of customers and/or servers impacted by an identified issue, as well as case notes directly shared by a customer representative and/or support case owner.

Data sources 110 can also include support requests 114. Support requests 114 can be reported by a customer, at any time, about any issue encountered when interacting with a product. Support requests 114 can be submitted by a customer online, over a phone or in person, for example at a help desk. A customer might submit a support request 114 without knowing which feature 118 caused the problem. Typically, a significant development delay is introduced into the product engineering process because of the difficulty in associating a support request 114 with a feature 118. As is discussed below, the present disclosure enables incoming support requests 114 to be captured within minutes and then automatically checked against related customer scenarios of active flights, for example by support data generation system 130 described below. This allows for rapid review, and fixes of problems associated with a feature release. The issues may be detected, and addressed, prior to the next flight iteration.

Product engineering environment 100 includes a support data generation system 130 which is configured to allow for rapid association of support requests 114 with features 118 within a flight. Support data generation system 130 illustratively receives flight information 126, which can include information on one or more features 118 within a flight identified in flight information 126.

After receiving flight information 126, support data generation system 130 can apply scenario mapping logic 132. Scenario mapping logic 132 can be configured to generate one or more customer scenarios in response to a feature within flight 126. A customer scenario can comprise an anticipated problem, for example an error message seen by as client, a feature not accessible, or not working as desired. For example, a customer scenario can comprise, after a deployed flight with an update, an e-mail application no longer sending push notifications. However, customer scenarios can also be designated manually by an engineer working on a given feature 118.

Support data generation system 130 can include keyword generator logic 136. Keyword generator logic 134, in response to feature 118, flight 126, and/or a generated customer scenario, generates associated keywords. The generated keywords can be used to automatically correlate a received support request 114 with a customer scenario and/or directly with a given feature 118.

Support data generation system 130 also includes a flight tracker 140. Flight tracker 140 is configured to track the progress of flight 126 as it is implemented. Flights 126 are often implemented in waves across different sets of receiving customers. For example, a given flight 126 could first be implemented (in a first wave) to only 1% of customers in a first iteration, and expanded (in a second wave) to 3% of customers in a second iteration. Flight tracker 140 is configured to track the progress of a flight as it is implemented in various waves. Flight tracker 140 comprises a feature tracker 142, which tracks any modifications to a feature as the flight progresses. For example, a feature 118 can undergo modifications in response to a problem detected in server requests 114. Flight tracker 142 also comprises an iteration tracker 144, which tracks the scope of different iterations of flight 126. Iteration tracker 144 can, for example, track specific customers that have received flight 126. Iteration tracker 144 can also track a scope of flight implementation, for example a percent implemented. Flight tracker 140 can also comprise other features 146.

Support data generation system 130 illustratively receives a support request 128 (which may be, for example, one of support requests 114) substantially as soon as it is received by data source 110. Each support request 128 received by support data generation system 130 is parsed by server request parsing logic 138. Server request parsing logic 138 is configured to detect keywords used in the support requests 128, and correlate them to the keywords generated by keyword generator logic 134, for example. This allows support data generation system 130 to quickly correlate a received support request 128 with a scenario or feature 118 within flight 126. In the event of a keyword match, support request 114 can be mapped to one or more individual features.

As support requests 128 are received, and parsed by support request parsing logic 138, keyword accumulator logic 136 is configured to track the frequency of different keywords. Keyword accumulator logic 136 can also track the frequency of customer scenarios, and the frequency of issues with a given feature 118, and/or with a given flight 126.

Flight 126 can be updated dynamically as issues are detected, for example, and one or more features 118 are modified. This can cause the frequency of received support requests 128 for a given feature to increase or decrease over time as new issues arise and old issues are resolved. Support data generation system 130 can include volume pattern identifier logic 148, which is configured to track detected issues with flight 126 over time. Volume pattern identifier logic 148 can track, for example, a volume of a detected keywords over time, a volume of a detected customer scenarios over time, a volume of detected issues with a feature 118 over time, and/or a number of support requests 128 over time (for example day to day, hour to hour, or week to week, etc.).

Functionality of support data generation system 130 has been described with respect to a single received support request 128 and a single flight 126. However, it is expressly contemplated that actual operating scenarios can be much more complicated, with multiple flights 126 in progress at a time and a plurality of support requests 114 incoming, often simultaneously. Additionally, while support data generation system 130 has been discussed only with respect to processing support requests 128 and flights 126, it is expressly contemplated that other functionality 166 is also possible.

Support data generation system 130 also comprises a user interface generation system 151 configured to generate a user interface 170. User interface 170 illustratively surfaces one or more metrics to a user, for example an engineer working on one or more features 118, by controlling data surfacing logic 168.

User interface generation system 151 comprises flight metrics generator logic 152 configured to generate flight metrics 172, and deliver them to user interface 170 using data surfacing logic 168. Flight metrics 172 can comprise any details pertaining to a current iteration, a past iteration, one or more features, and/or support request information received and processed by support data generation system 130. In one example, flight metric generator logic 152 detects a user input requesting flight metrics 172 and is configured to present flight metrics 172 on user interface 170.

User interface generation system 151 also comprises feature metric generator logic 155 configured to generate feature metrics 174, and deliver them to user interface 170 by controlling data surfacing logic 168. Feature metrics 174 can comprise any details pertaining to specifications of a feature 118 in a current iteration, a past iteration, one or more keywords or customer scenarios detected for feature 118, and/or other support request information received and processed by support data generation system 130. Feature metric generator logic 155 is configured to present feature metrics 174 on user interface 170 upon detecting a user input from a user, in one example.

User interface generation system 151 also comprises iteration metric generator logic 156 configured to generate iteration metrics 176, and deliver them to user interface 170 by controlling surfacing logic 168. Iteration metrics 176 can comprise any details pertaining to current or past iterations 120 of a flight 126.

User interface generation system 151 also comprises detailed iteration metric generator logic 162 configured to generate detailed iteration metrics 182, and deliver them to user interface 170 by controlling data surfacing logic 168.

Detailed iteration metrics 182 can comprise, for example, a scope of each iteration 120, modifications to any features 118 between iterations, and/or support request information for features 118 of flight 126 in each iteration 120.

User interface generation system 151 also comprises support request count generator logic 158, configured to generate support request count metrics 178, and deliver them to user interface 170 by controlling data surfacing logic 168. Support request count metrics 178 can comprise, for example, a number of support requests 114 related to a feature 118 over time, by iteration 120, by keyword or by customer scenario, or otherwise.

User interface generation system 151 also comprises alert indication generator logic 160, configured to generate an alert indication 180, and deliver alert indication 180 to user interface 170 by controlling data surfacing logic 168. Alert indication 180 can comprise an indication that a feature 118 needs modification, for example based on an identified volume pattern of incoming support requests (for example, from volume pattern identifier logic 148). Depending upon a given volume pattern, alert indication 180 comprises either a warning signal (e.g. to halt a next iteration 120) or a go forward signal (e.g. to go ahead with a next iteration 120). Alert indication generator logic 160 generates a warning signal, for example, if support requests 114 (e.g. identified keywords or consumer scenarios) related to a given feature 118 are increasing over time after a previous iteration, or after an update to the given feature 118. Alternatively, if support requests 114 are decreasing and/or steady over time, alert indication 180 can generate the warning signal in other ways as well, and it can indicate that the next iteration 120 is approved to go forward. Alert indication 180 can also indicate a new issue identified with a feature.

User interface generation system 151 can also include other functionality 164 configured to provide other indications or metrics 184 to user interface 170 by controlling data surfacing logic 168.

User interface 170 can be provided to a feature engineering platform 190 where users may be working on updates to feature 118 or flight 126. Feature engineering platform 190, using support data generation system 130, can receive feedback information from customers about a feature 118 and/or flight 126 much more quickly than in previous systems. For instance, feedback, in the form of flight metrics 172, feature metrics 174, iteration metrics 176, detailed iteration metrics 182, support request count metrics 178, alert indications 180 and/or other information 184, can be available in minutes, for example, from the submission of a support request 114, or even quicker.

Feature engineering platform 190, with substantially instant feedback available about a flight 126 and feature 118, can review support requests and customer scenarios, and provide a solution to the issues in the support requests. Feature update generator logic 192 can provide an update to a feature 118, which can be implemented in the next iteration 120. Additionally, flight update generator logic 194 can provide an update to flight 126. Feature engineering platform 190 also has other functionality 196 for an engineer to use in creating new features 118 for future flights 126, or to update existing features 118.

Figure 2:
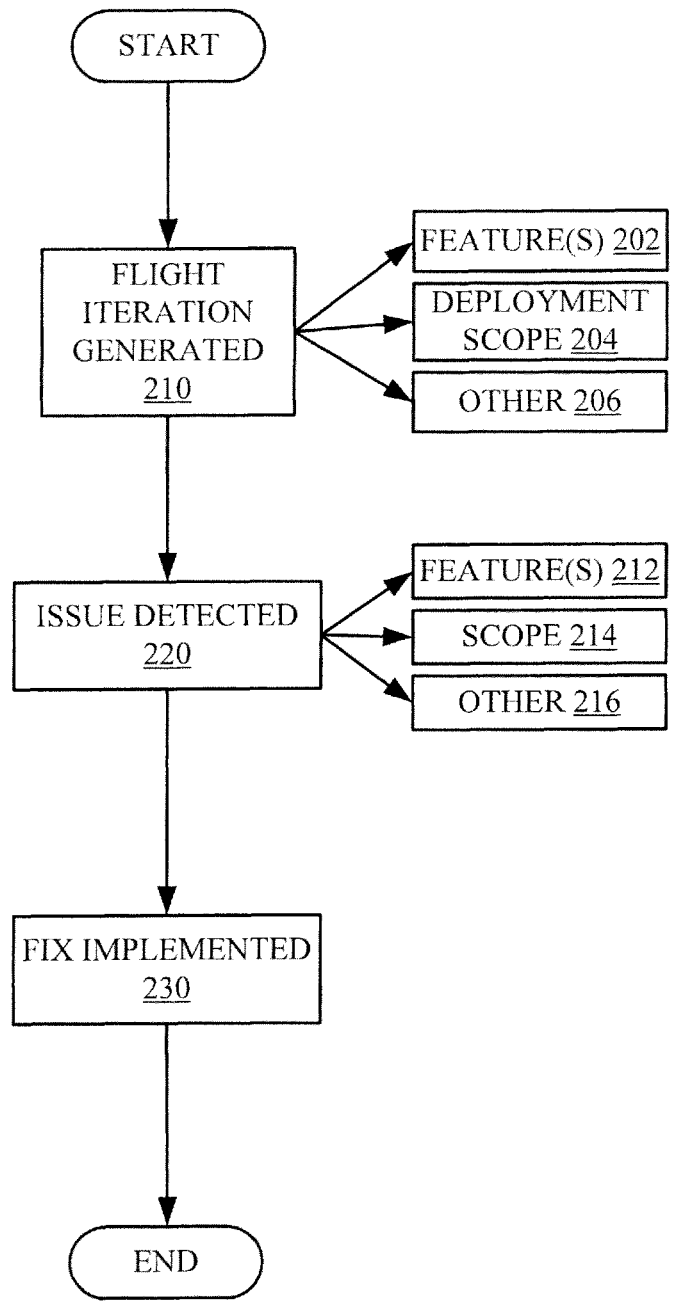
FIG. 2 shows a flow diagram of one example of using the product engineering environment.

FIG. 2 shows a flow diagram illustrating one example of the operation of a product engineering environment 100. More specifically, FIG. 2 illustrates one example of a flight deployment within a cloud-based system. For example, the flow diagram shown in FIG. 2 illustrates one potential use of product engineering environment 100 illustrated in FIG. 1. FIG. 2 illustrates some of the functionality of support data generation system 130, for example in communication with any of data sources 110 and user interface 170.

At block 210, a flight iteration is generated. A flight iteration can comprise one or more features 202 and a deployment scope 204. Deployment scope 204, for example, comprises a portion of a customer base that receives a specific feature 202 within the generated flight iteration. The flight iteration can also be characterized by other features 206. Flights of features can be generated, for example, by feature engineering platform 190, using flight update generator logic 194, with new feature iterations generated using feature update generator logic 192.

At block 220 an issue is detected, for example by support data generation system 130. The issue can be detected with respect to one or more features 212, and can be associated with a flight deployment scope 214. The issue can also be detected with respect to other criteria 216. Identification of a feature 212 can occur automatically in response to an issue being detected.

At block 230 a fix is implemented. The fix can be generated by one or more product engineers in response to a detected issue, for example using feature engineering platform 190. For instance, a next iteration of a feature can be generated in order to fix a detected issue with that feature.

As indicated in FIG. 2, once a fix has been implemented, the operations can be repeated with a new flight iteration generated in block 210. This allows for the fixed feature to be redeployed at a current flight scope, for example, or the feature in the flight iteration may be expanded to a new flight scope.

The ability to rapidly detect issues associated with a specific feature, within a specific flight can allow for rapid fixes to be implemented. Currently, many cloud architectures use multiple flights of features that undergo deployment simultaneously. As each flight is deployed to greater numbers of customers, issues are detected and reported. However, a customer might not be able to identify which feature, of which flight, is causing a specific problem. Instead, the customer reports the issue experienced, often in a support request. Support data generation system 130 then identifies a feature associated with an incoming support request. Additionally, in order to ensure that fixes are quickly generated, processing of each incoming support request proceeds automatically, and rapidly.

Figure 3:
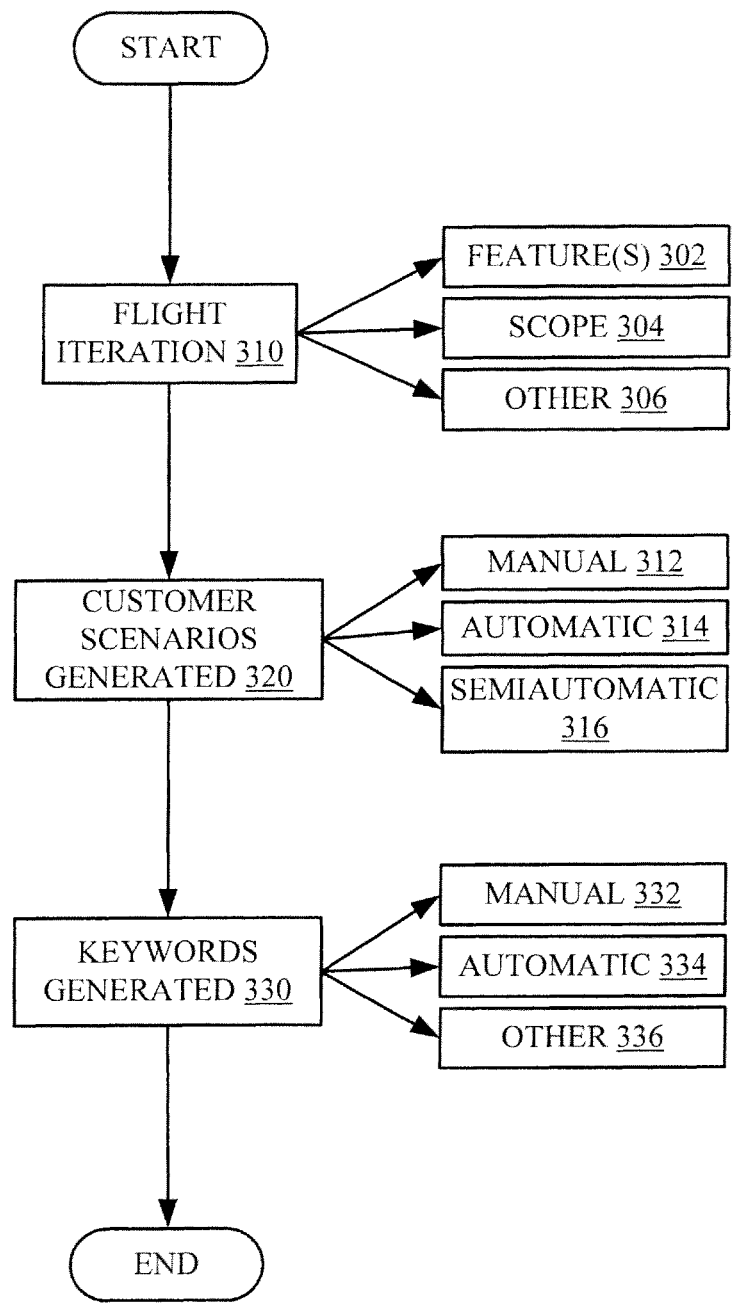
FIG. 3 shows a flow diagram of one example of processing a flight iteration within the process engineering environment.

FIG. 3 shows a flow diagram of one example of the operation of environment 100 in iteration. This can be used to ensure that issues are rapidly detected once a feature is deployed, for example in a flighted infrastructure. One of the delay causes within a cloud-based system is ensuring that the issues are detected and reported to product engineers in a timely manner FIG. 3 shows one example of a pre-launch process for ensuring that issues are rapidly, and automatically, associated with a specific feature or flight.

At block 310 a flight iteration is generated. For example, a flight iteration can be generated for the first time with an initial feature 302, and an initial scope 304, and with other flight features 306. However, the processing shown in FIG. 3 is also useful for a second, third, or subsequent iteration of a flight. Subsequent iterations can comprise the same features 302, updated features 302, as well as the same scope 304, or a broader or narrower scope 304 compared with a previous flight. For example, after fixing an issue, the flight iteration may be generated, with the feature fix, at the same scope 304 as a previous iteration.

At block 320, one or more customer scenarios are generated. Customer scenarios can be generated manually, for example by a product engineer responsible for a new feature.

However, customer scenarios can also be generated automatically, as indicated in block 314, or semi-automatically as indicated in block 316. A customer scenario can comprise an expected issue with a feature, flight, scope, etc.

At block 330 one or more keywords are generated. Keywords can be generated manually, as indicated in block 332, for example by a product engineer. Keywords can also be generated, for example automatically, as indicated in block 334, such as by parsing a customer scenario for appropriate keywords, and associating those keywords with a feature. Keywords can also be generated in another suitable manner, as indicated in block 336. Once generated, customer scenarios and keywords can be stored within data sources 110, for example, and associated with features 118 and flight iteration 116.

Figure 4:
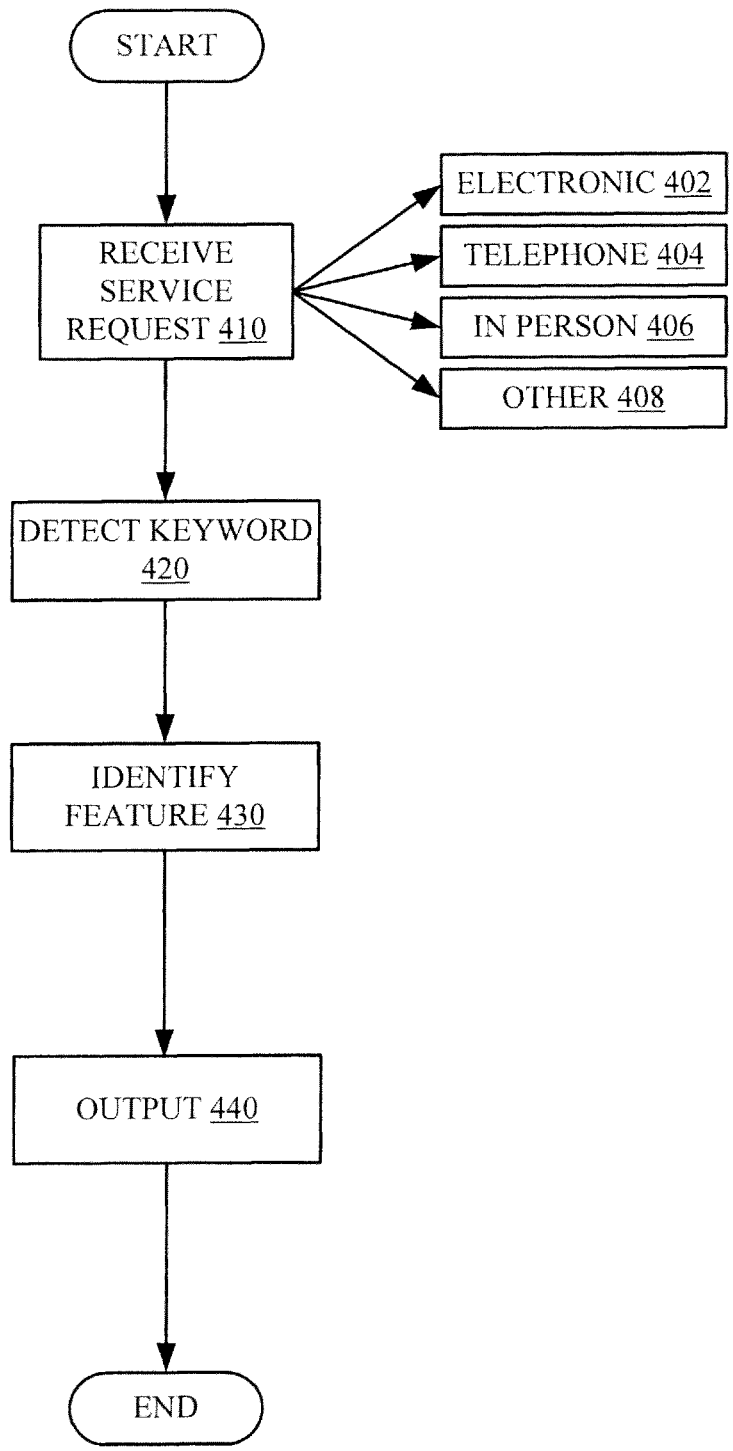
FIG. 4 shows a flow diagram of one example of processing a support request within the product engineering environment.

FIG. 4 shows a flow diagram of one example of processing a support request within the product engineering environment 100. As stated previously, an incoming support request is processed quickly in order to provide an indication to a product engineer that an issue has been detected with one or more features, or with one or more different flights. FIG. 4 illustrates one example of the operation of environment 100 in detecting an issue, associating it with a feature, and surfacing the issue.

At block 410 a support request is received. For example support request 120 can be received by support data generation system 130, as shown in FIG. 1. The support request can be received electronically, as indicated in block 402, for example by a user inputting a support request on a website, or other user interface. A support request can also be received over the telephone, as indicated in block 404, for example by a user calling a customer support line. Additionally, a support request can be received in person, as indicated in block 406, or in any other suitable manner, as indicated in block 408. Support requests can be received, and processed, by support data generation system 130.

At block 420 a keyword is detected. A keyword may be detected automatically, for example by parsing a received support request using support request parsing logic 138, for one or more keywords and associating the detected keyword with a feature, as indicated in block 430. Keywords can be detected and tracked over time, for example using keyword accumulator logic 136.

At block 440, an output is generated. The output generated in block 440 can comprise an issue identifier identifying a feature and/or a flight, and can be provided to a process engineer, for example using user interface generation system 151, presented on user interface 170. The report can also comprise an alert indication 180, for example, generated by alert indication generator logic 160, or other items.

Figure 5:
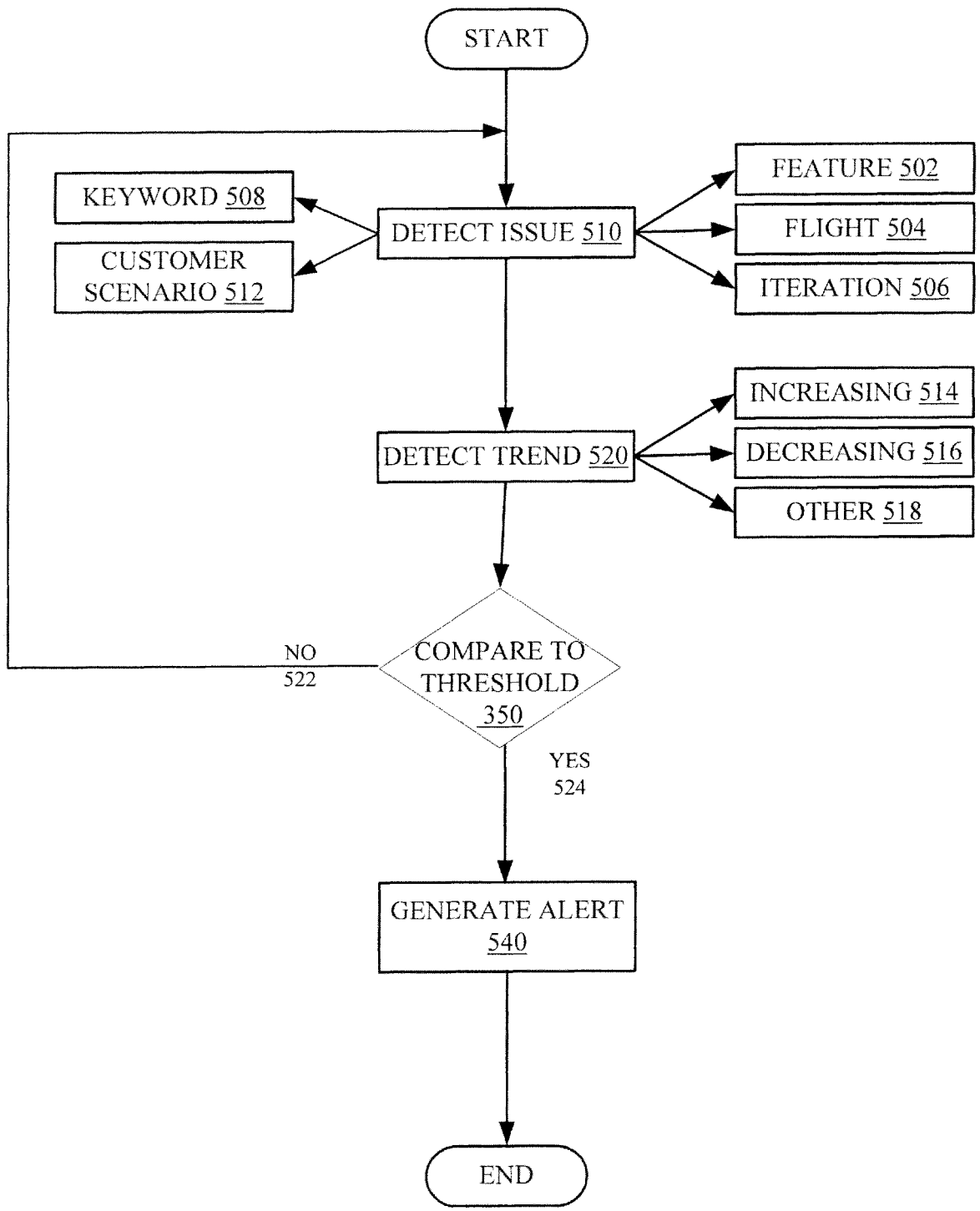
FIG. 5 shows a flow diagram of one example of generating an alert within the product engineering environment.

FIG. 5 shows a flow diagram of one example of generating an alert within the product engineering environment 100. The processing in FIG. 5 can be used to generate an alert, for example, in response to a detected issue.

At block 510 an issue is detected. The issue can be detected with respect to a specific feature, as indicated in block 502, a specific flight, as indicated in block 504, or a specific flight iteration, as indicated in block 506. Detecting an issue can comprise detecting a keyword in a service request, as indicated in block 508, associated with a specific issue, or detecting a customer scenario, as indicated in block 512. Detecting an issue can include using support request parsing logic 138, in response to a received support request 128, to detect a keyword. It can include using keyword accumulator logic 136, and associating the keyword with a flight, feature, and/or iteration using flight tracker 140, feature tracker 142, iteration tracker 144 and/or other tracker 146, respectively.

In block 520, a trend can be detected. A trend can comprise detecting how frequently an issue is reported, for example how frequently a given keyword is used in service requests, how frequently a customer scenario is matched, how frequently a specific feature is at issue, etc. Trends can be detected, for example, using volume pattern identifier logic 148, which can detect an increasing trend, as indicated in block 514, a decreasing trend, as indicated in block 516, or another trend, as indicated in block 518.

At block 530 a detected number of issues and/or a trend is compared to a threshold. For example, any detected increasing trend of an issue can be characterized as above a threshold, thus generating an alert. However, a decreasing trend can be characterized as below a threshold, thus not generating an alert. If a detected number of issues is higher than a threshold, as indicated by arrow 524, an alert is generated, as shown at block 540. A threshold can, for example, comprise a single instance of an issue, such that all detected issues are reported using alert indications 180 on a user interface 170. However, in another example, an alert is only generated at block 540 when an increasing trend is detected. If a threshold is not met, as indicated by arrow 522, the process in FIG. 5 can return to block 510 and repeat without generating an alert.

Figure 6:
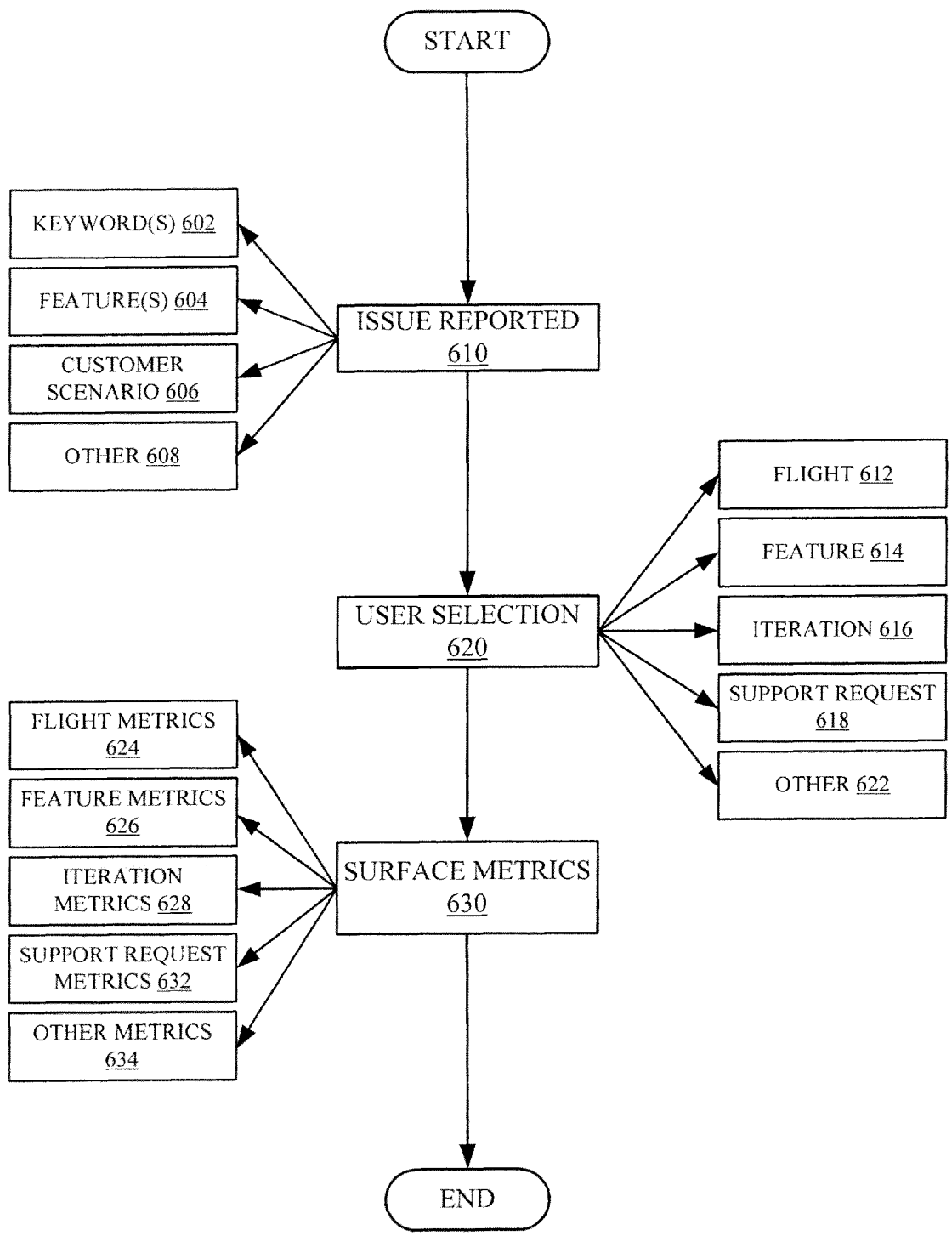
FIG. 6 shows a flow diagram of one example of generating metrics related to a flight within the product engineering environment.

FIG. 6 shows a flow diagram of one example of generating metrics relating to a flight within a product engineering environment 100. The operation shown in FIG. 6 can provide a product engineer with information in order to analyze, and generate a fix for, a detected issue. It can be useful to provide a product engineer with detailed information related to the number of issues generated, as well as currently flighted features and flight information.

At block 610 an issue is reported. Reporting an issue can include support request parsing logic 138 detecting and providing indications of one or more detected keywords, as indicated in block 602. The issue can also be reported as corresponding to one or more features as indicated in block 604. Detecting an issue can also comprise matching an issue reported to one or more customer scenarios, as indicated in block 606. However, reporting an issue can also be done by controlling other mechanisms, as indicated in block 608, for example a customer service representative directly reporting an issue to a product engineer, etc.

At block 620 a user input is detected, for example through a user interface 170. The user input can comprise a user request to view details regarding a specific flight, as indicated in block 612, a specific feature, as indicated in block 614, a specific iteration, as indicated in block 616, a specific support request, as indicated in block 618, or another selection, as indicated in block 622.

At block 630, metrics are surfaced, for example on user interface 170, in response to a received user selection. For example, flight metrics 172 can be surfaced, as indicated in block 624, using flight metric generator logic 152. Feature metrics 174 can be surfaced, as indicated in block 626, by feature metric generator logic 155. Iteration metric 176 can also be surfaced, using iteration metric generator logic 156, as shown in block 628. Support request metrics 178 (such as a count of support requests) can be surfaced, as indicated in block 632, by support request count generator logic 158. Other metrics 184 can also be surfaced, as indicated in block 634, for example using other data surfacing logic 164.

Figure 7A:
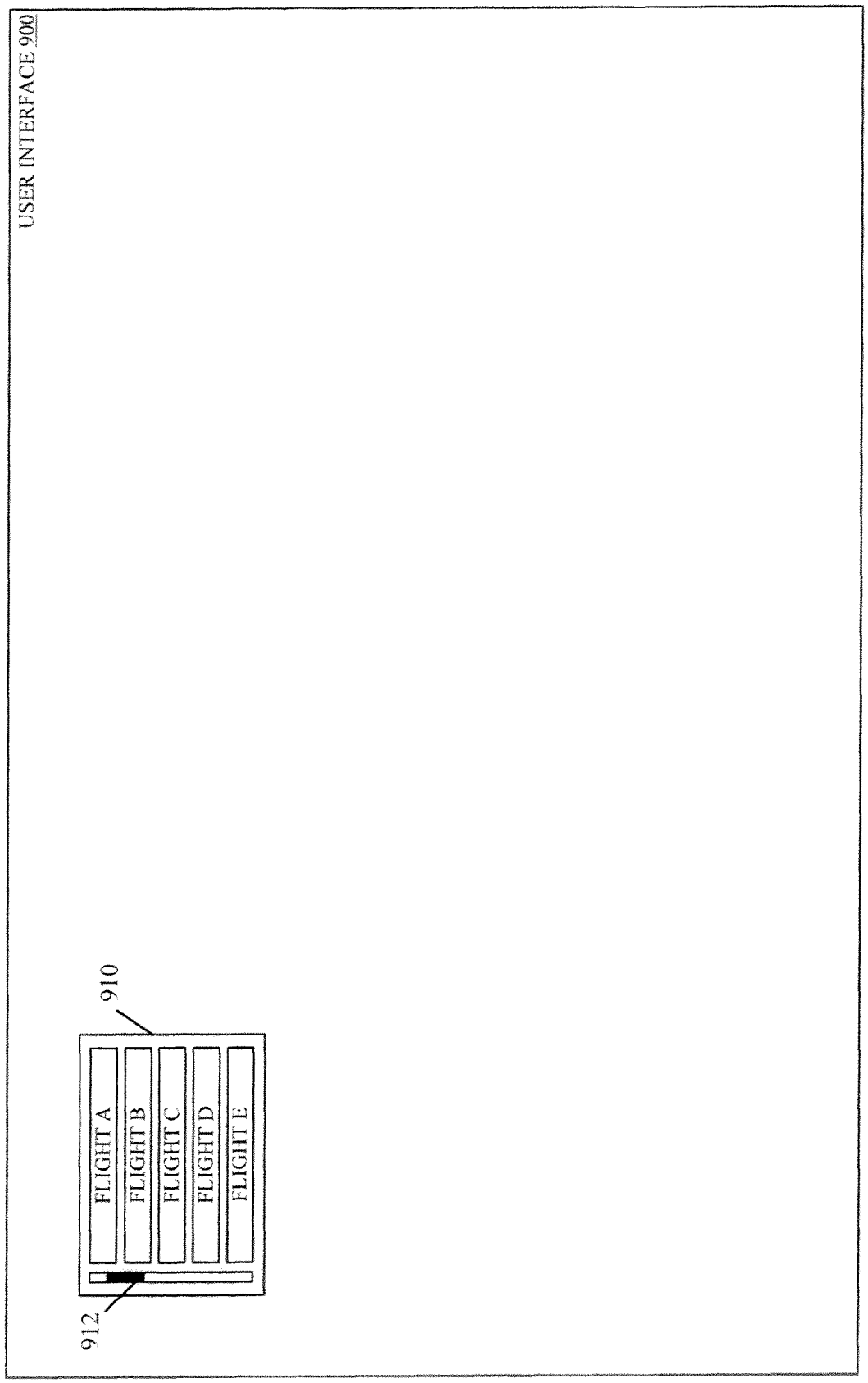
FIGS. 7A-7C illustrates some example user interfaces generated by the product engineering environment.
Figure 7B:
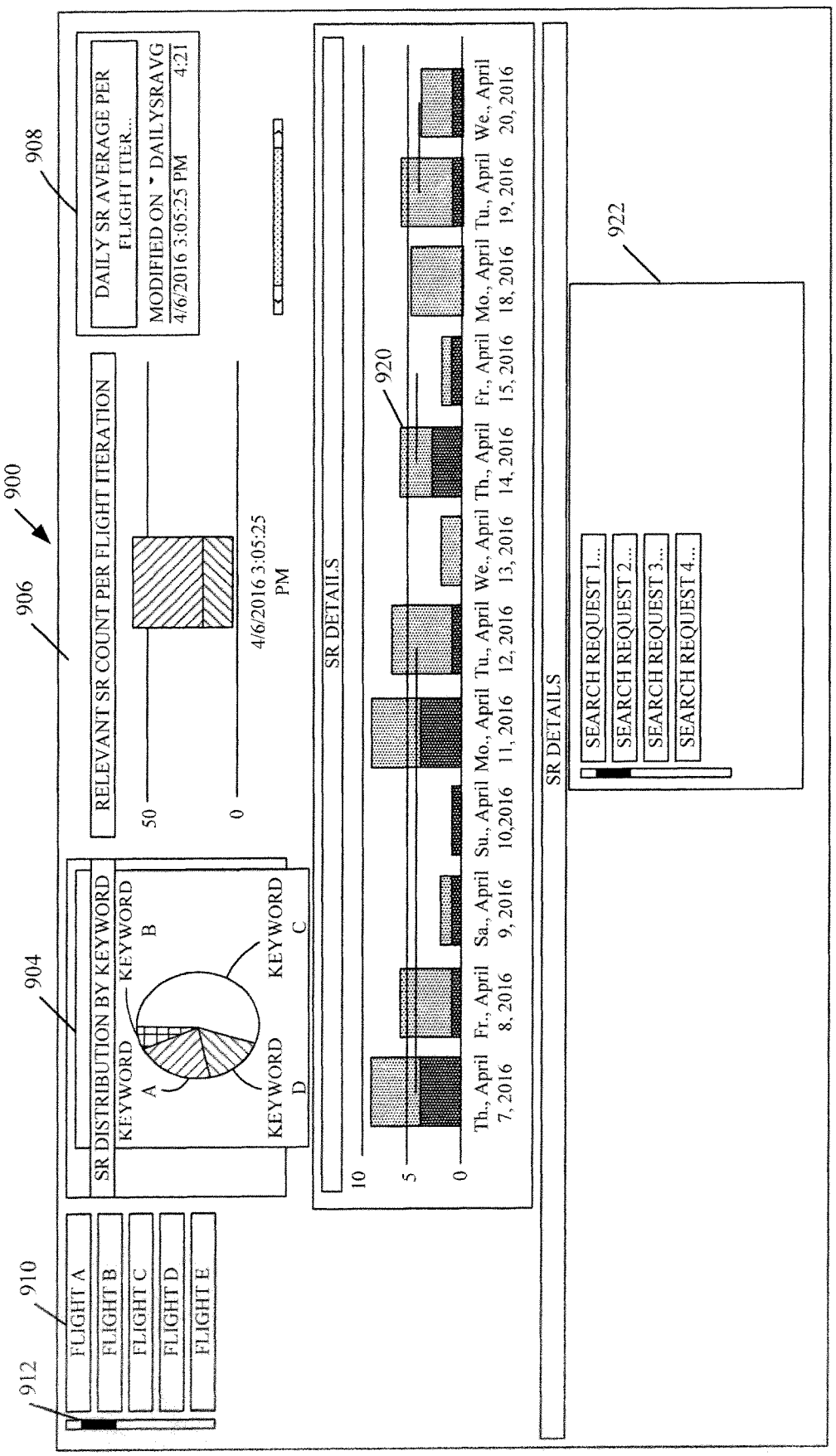
Figure 7C:
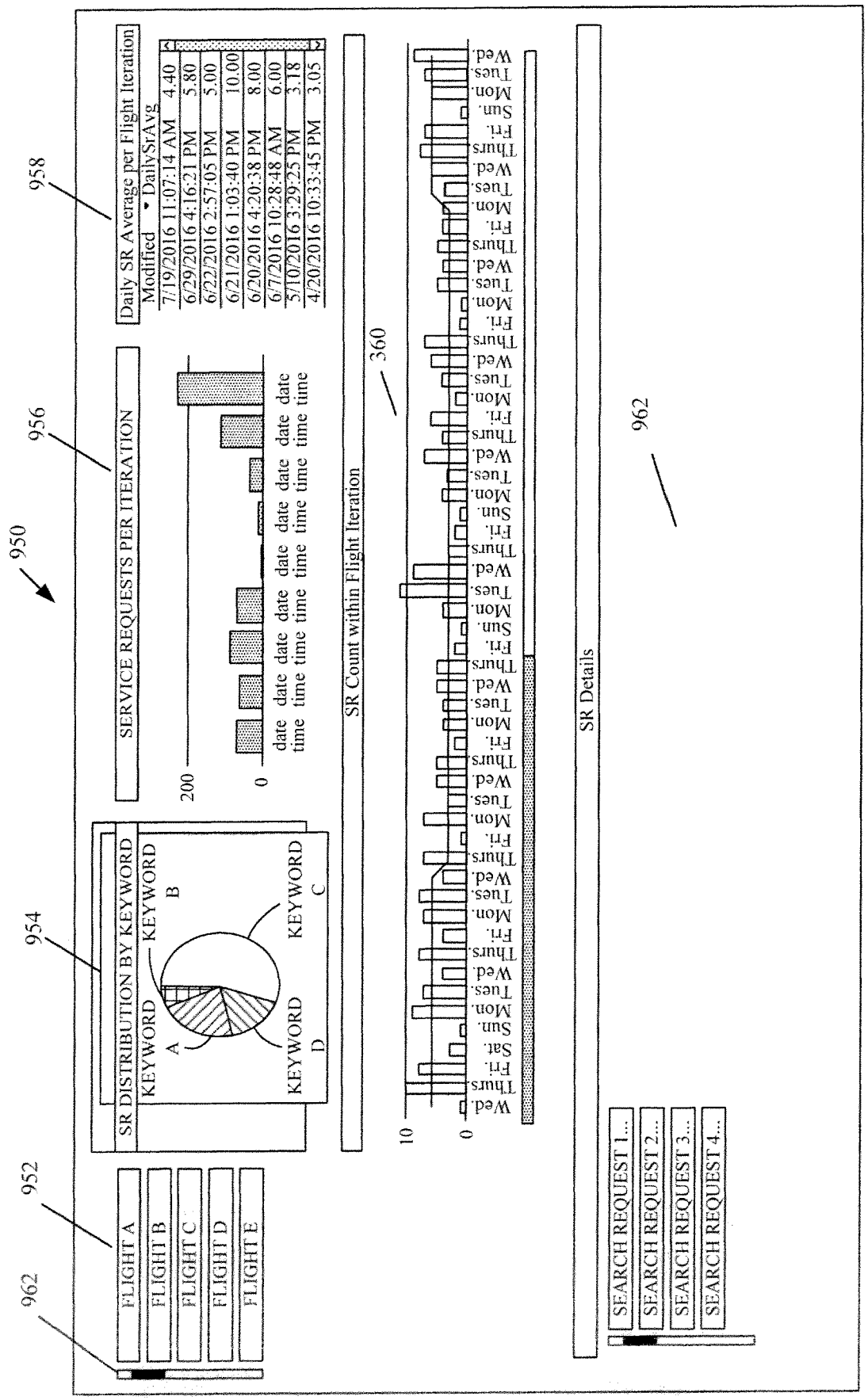

FIGS. 7A-7C illustrate some example user interfaces that can be generated by the product engineering environment 100. The user interfaces of FIG. 7A-7C can be similar to, or presented on, user interface 170, and illustrate metrics similar to those described with respect to FIG. 1. However, FIGS. 7A-7C are only example displays that can be displayed on user interface 170. Other user interface configurations are expressly contemplated.

FIG. 7A illustrates an example user interface that a product design engineer accesses, for example when an alert is generated, or to monitor the progress of a specific flight. User interface 900 includes a flight selection mechanism 910, showing flights A-E. Additional in-progress flights can be accessed using scrollbar 912, for example. Selection of any available flight can, for example, navigate the user to the example interfaces shown in FIG. 7B or 7C.

FIG. 7B illustrates an example user interface of a dashboard information generated by a display with analysis of a launched flight, on its first iteration. As discussed above, each iteration is characterized by a number of features, each of which is correlated to by customer scenarios and/or keywords.

Dashboard 900 includes flight selection mechanism 910. Many flights are often in development and/or implementation, at any given time. Flight selection mechanism 910 allows a user to select a specific flight which, when indicated, provides detailed metrics about implementation progress and any observed issues with implementation.

Dashboard 900 includes a keyword distribution display element 904. As illustrated in FIG. 7B, keyword distribution display element 904 can comprise a pie chart illustrating percentages of received support requests 114 with a given keyword. Keyword distribution display element 904 can be further selected by a user. For example, the darkly shaded portion of keyword distribution display element 904, corresponding to a "Keyword A" is currently selected, and instances of the selected keyword are likewise shaded throughout dashboard 900. Keyword distribution display element 904 is populated by keyword accumulator logic 136, for example, based on parsing of support requests 114 by support request parsing logic 138. When logic 138 identifies instances of a keyword, the instances are accumulated by accumulator logic 136.

Dashboard 900 also includes a support request count per flight iteration display element 906, which indicates a number of support requests that are recorded and associated with a given iteration of a flight. However, dashboard 900 can also show a number of support requests associated with a given feature in a flight iteration, for example. As illustrated, a portion of the support request count per flight iteration display element 906 is associated with the "Keyword A" keyword, which corresponds to Feature A, for example. Support request count per flight iteration can be generated by support request count generator logic 158. Dashboard 900 also includes a daily support request average per flight iteration display element 908, which can also be generated by support request generator logic 158. The average per flight iteration represented by display element 908 can serve as a threshold, for example, in order to generate an alert. For instance, if a significant number of support requests 114 are received in excess of the daily average, a new issue might have developed with one or more features 118, such as Feature A.

Dashboard 900 also includes a support request count within flight iteration display element 920, which can be generated by detailed iteration metric generator logic 162. The support request count within flight iteration 920 is a detailed view of support requests 114 received since the latest iteration was implemented.

Dashboard 900 also includes a support request detailed view 922. Detailed view 922 illustrates the text submitted with each support request 114, such that a developer can better identify what is causing the issue experienced by customers.

Dashboard 900 has been described with respect to some illustrative features. However, other functionality, features, and arrangements of functionality are also expressly contemplated. For example, dashboard 900 can also include information on the scope of a given iteration and which tenants reported a specific issue.

FIG. 7C illustrates an example user interface of a dashboard 950 with analysis of an introduced flight after several iterations. Dashboard 950, in some examples, is similar to dashboard 900, and similar features are numbered similarly. Dashboard 950 comprises a flight selection mechanism 952 that, when actuated, populates the illustrated information for a given flight. Dashboard 950 also includes a keyword distribution display element 954, which is illustratively a pie chart. While the keywords of keyword distribution display element 954 are actuatable, in one example, none are actuated in the example shown in FIG. 7C. Dashboard 950 also includes a support request count per flight iteration display element 956, which illustratively shows the different numbers of support requests 114 received during different iteration periods. Dashboard 950 also includes a daily support request average per flight iteration display element 958 for each iteration period. Dashboard 950 also includes a support request count within flight iteration display element 960 and a support request detailed view display element 962.

Dashboard 950 illustratively provides details on the different support requests received in each iteration 956, as well as detailed information about support requests over time 960. Such information can be used by a product engineer (or other person) to understand whether a fix for a detected feature issue was successful in a later iteration. Such information is also useful to understand whether an issue is generating an increasing number of support requests over time.

A support data generation system has been described that rapidly identifies the customer issues and correlates them with newly released feature flights, surfacing issues with cloud features—within a very short time of receiving a support request. In addition, feature teams are brought closer to the customers because they can review the relevant customer feedback, themselves, promptly. As a result, the customer feedback and issues govern the speed at which a flighted feature is expanded to additional cloud customers. And from the customers' point of view, a real problem in product which used to take weeks to reach feature teams, now reaches them much earlier and can be resolved faster than expected. This also directly reduces the support cost incurred by a developer because when an issue is reported to the feature team, they can fix the issue before more customers are affected and require technical support. For any cloud computing company, an intelligent listening system like that described herein will result in improved quality of cloud service, reducing the number of customers encountering issues, and will also reduce support costs.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
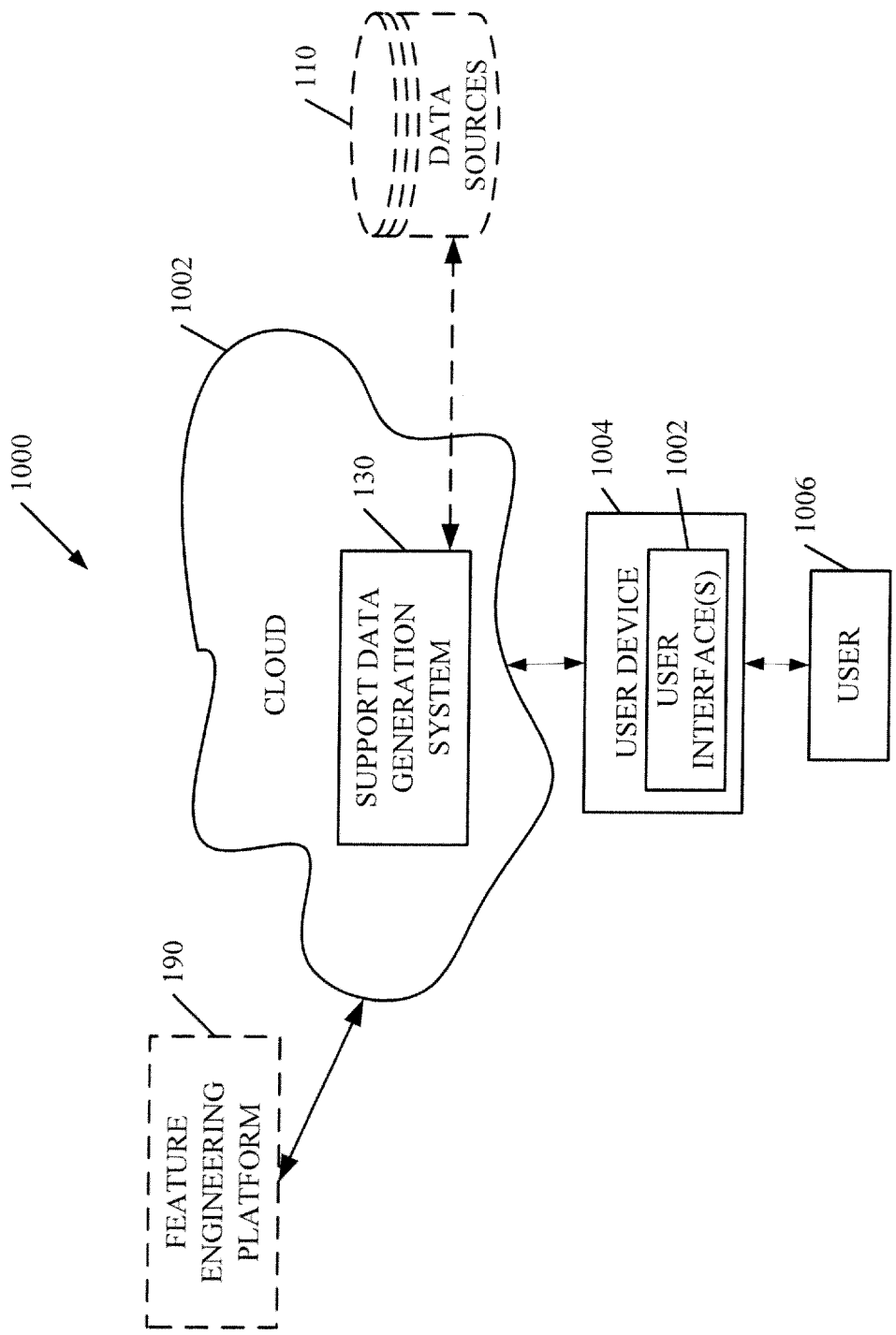
FIG. 8 is a block diagram showing a mobile device deployed in a cloud computing environment.

FIG. 8 is a block diagram of engineering environment 100, shown in FIG. 1, except that its elements are disposed in a cloud computing architecture 1000. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of engineering environment 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud can be managed by the organization itself and the infrastructure is typically not shared with other organizations. The organization still maintains the hardware to some extent, such as installations and repairs, etc.

In the embodiment shown in FIG. 8, some items are similar to those shown in FIG. 1 and they are similarly numbered. FIG. 8 specifically shows that support data generation system 130 is located in cloud 1002 (which can be public, private, or a combination where portions are public while others are private). Therefore, user 1006 uses a user device 1004 that includes tenant 1004 to access those systems through cloud 1002.

FIG. 8 also depicts another embodiment of a cloud architecture. FIG. 8 shows that it is also contemplated that some elements of environment 100 are disposed in cloud 1002 while others are not. By way of example, data sources 110 can be disposed outside of cloud 1002, and accessed through cloud 1002. In another embodiment, support data generation system 130 is also outside of cloud 1002. Regardless of where they are located, they can be accessed directly by device 1004, through a network (either a wide area network or a local area network), they can be hosted at a remote site by a service, or they can be provided as a service through a cloud or accessed by a connection service that resides in the cloud. All of these architectures are contemplated herein.

It will also be noted that environment 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
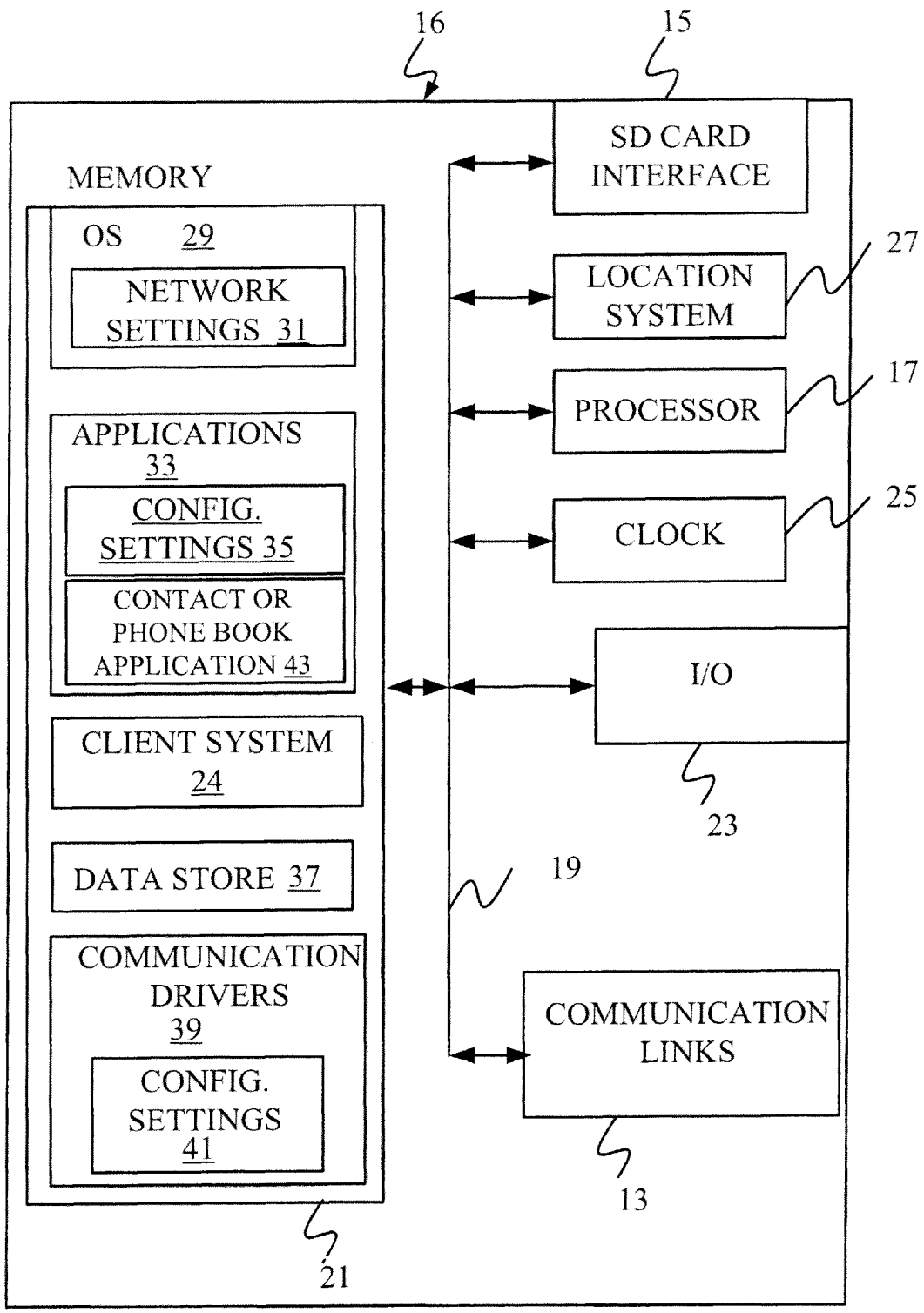
FIGS. 9-11 show examples of mobile devices.
Figure 10:
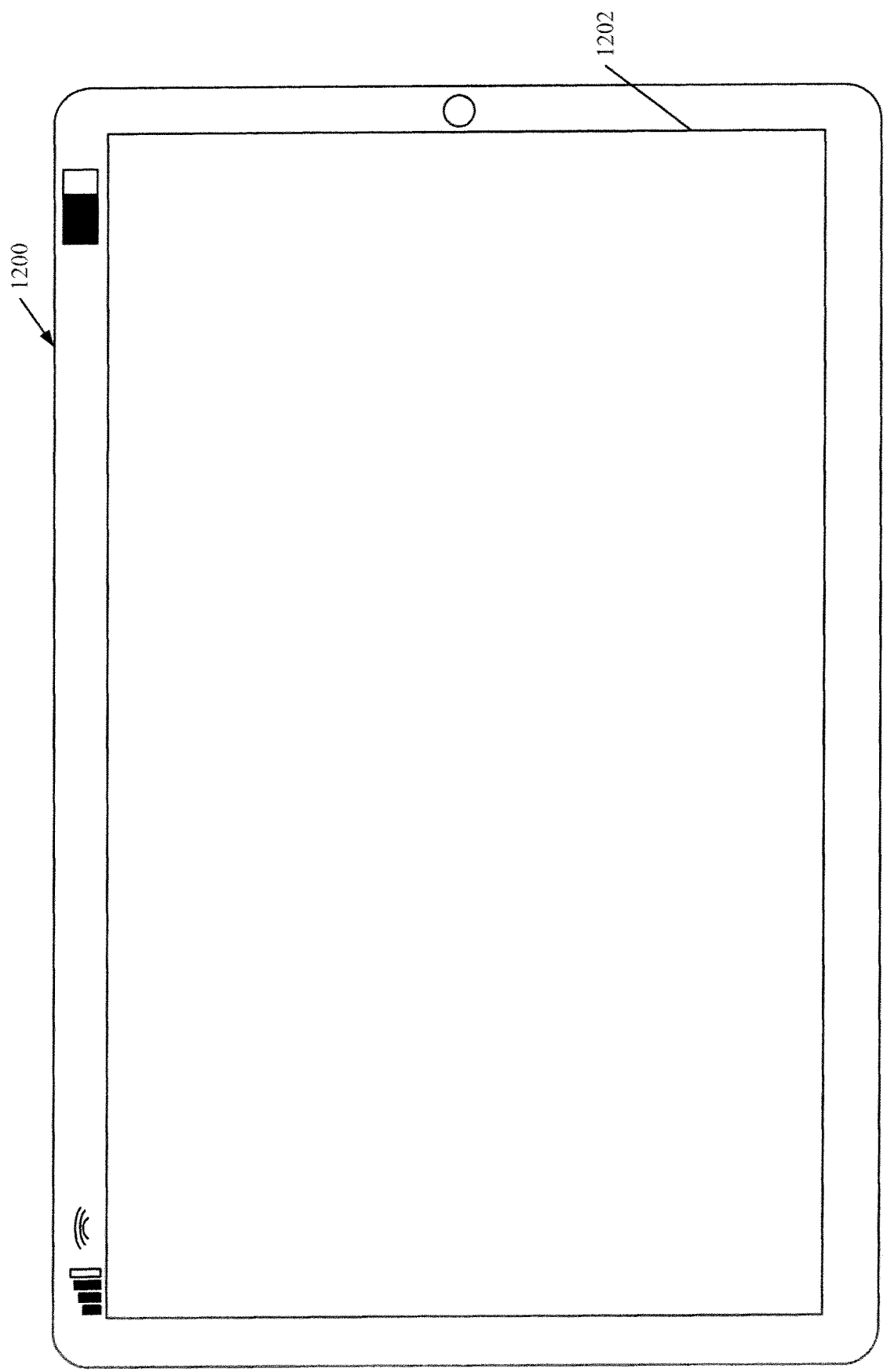
Figure 11:
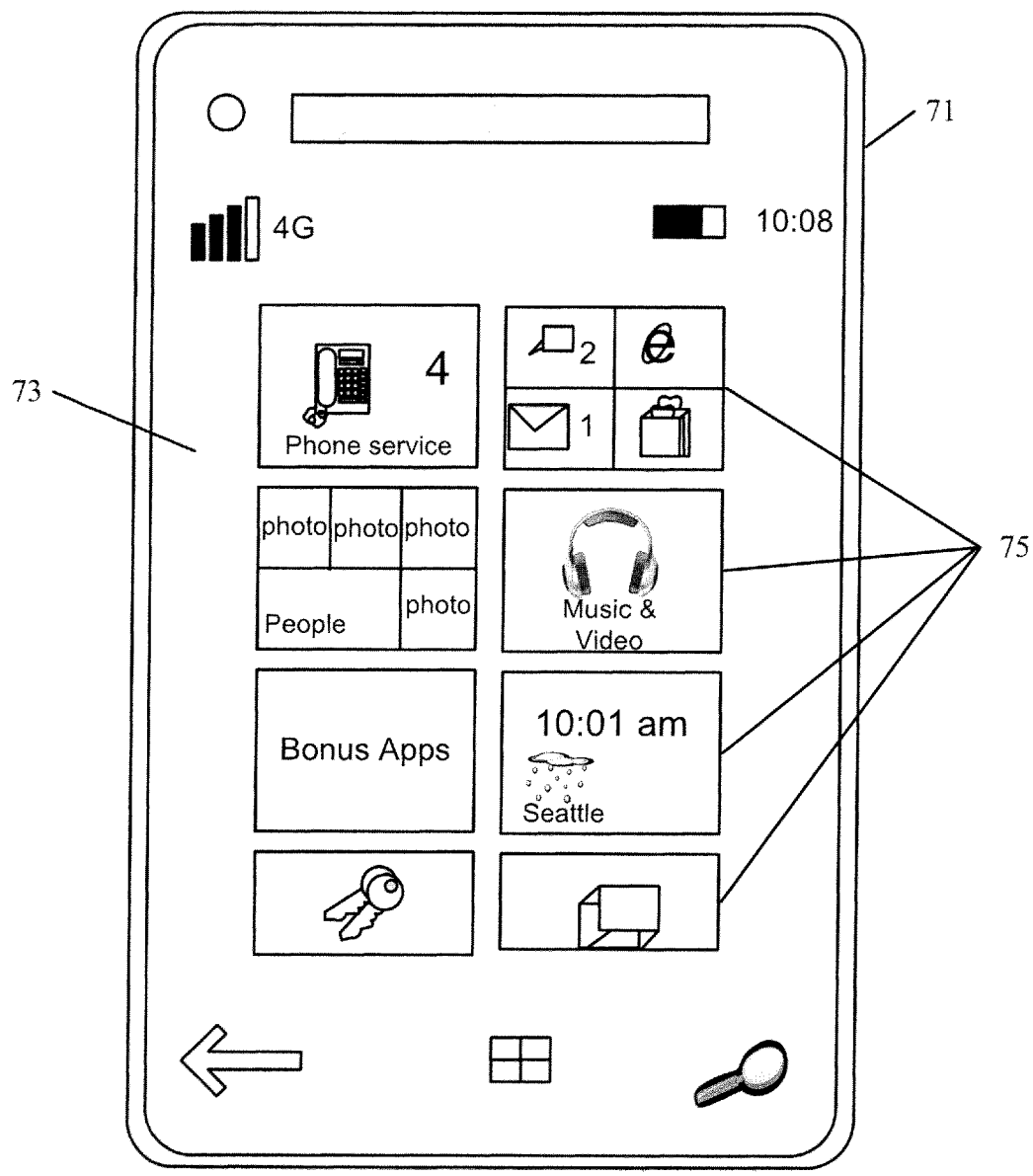

FIG. 8 is a simplified block diagram of one illustrative embodiment of a handheld or mobile computing device that can be used as a user's or client's hand held device 16, in which the present system (or parts of it) can be deployed. FIGS. 9-11 are examples of handheld or mobile devices.

FIG. 9 provides a general block diagram of the components of a client device 16 that can run components of support data generation system 130, or feature engineering platform 190, or other features of environment 100. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17, along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Applications or the items in data stores 110, for example, can reside in memory 21. Similarly, device 16 can have a client business system 24 which can run various business applications or embody parts or all of tenant 104. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 10 shows one embodiment in which device 16 is a tablet computer 1200. Screen 1202 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 1200 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1×rtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 11 is similar to FIG. 10 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
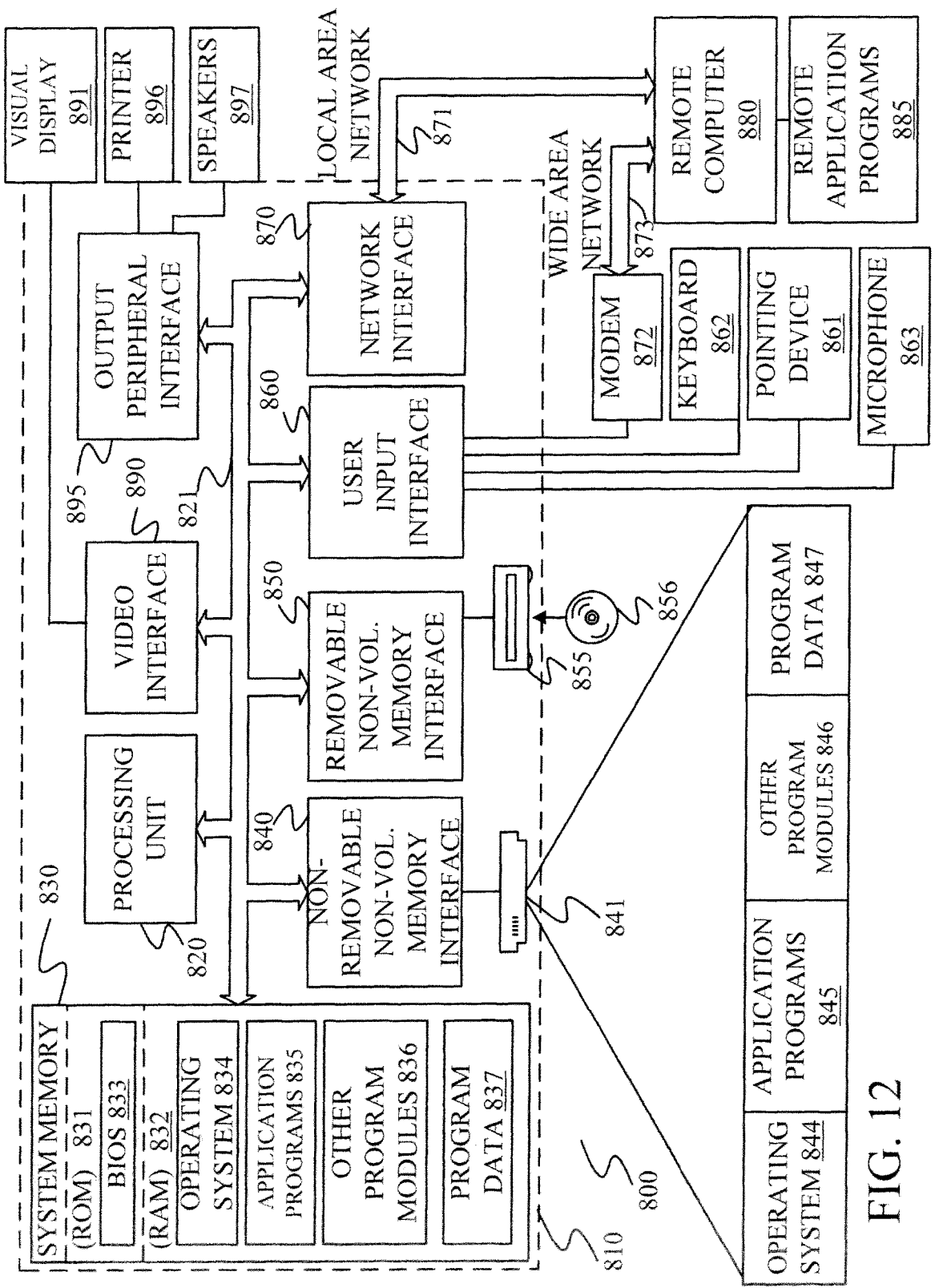
FIG. 12 shows one example of a computing environment that can comprise, or be used with, a mobile device or in the environments shown in the previous FIGS.

FIG. 12 is one embodiment of a computing environment in which architecture 100, or parts of it, (for example) can be deployed. With reference to FIG. 12, an exemplary system for implementing some embodiments includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a method of generating an alert within a flighted infrastructure, the method comprising:

detecting, using a support data generation system, an indication of an issue within the flighted infrastructure;

identifying, based on the detected indication, a feature undergoing implementation within the flighted infrastructure, wherein identification occurs automatically after the indication is detected;

generating an alert, wherein the alert comprises the detected indication and the identified feature; and controlling surfacing logic to provide the generated alert on a user interface.

Example 2 is the method of any or all previous examples, wherein detecting an indication comprises receiving a support request, and detecting a previously-defined keyword in the received support request.

Example 3 is the method of any or all previous examples, wherein detecting an indication comprises receiving a support request, and detecting a previously-defined customer scenario based on the received support request.

Example 4 is the method of any or all previous examples, wherein detecting an issue comprises automatically parsing a received support request for the indication of the problem.

Example 5 is the method of any or all previous examples, wherein identifying the feature comprises identifying that the feature is associated with a flight of features undergoing implementation within the flighted infrastructure.

Example 6 is the method of any or all previous examples, wherein detecting the indication of the issue comprises detecting that the issue is associated with an iteration of the flight of features.

Example 7 is the method of any or all previous examples, wherein detecting the indication of the issue comprises detecting that the issue is associated with a scope.

Example 8 is the method of any or all previous examples, and further comprising:
comparing the detected indication to a threshold; and
wherein generating the alert comprises detecting that the indication surpasses the threshold.

Example 9 is the method of any or all previous examples, wherein detecting that the indication surpasses the threshold comprises detecting that the indication is greater than a maximum number of keywords associated with the feature.

Example 10 is the method of any or all previous examples, detecting that the indication surpasses the threshold comprises detecting that the indication is greater than a number of support requests associated with the feature.

Example 11 is the method of any or all previous examples, detecting that the indication surpasses the threshold comprises detecting a trend indicating that a number of support requests associated with the feature is increasing over time.

Example 12 is a computing system configured to report an issue with a feature flight undergoing deployment in a cloud computing environment, the computing system comprising:
a support data generation system configured to communicate with a data source, and configured to receive a plurality of support requests; and
instructions, stored within the computing system, the instructions configured to cause the support data generation system to, when each of the plurality of support requests is received:
parse, utilizing support request parsing logic, the received support request and identifying a keyword substantially simultaneously after the support request is received;
identify, using a flight tracker, a feature, within the feature flight, based on the identified keyword, wherein the feature is identified based on a detected association between the identified keyword and the feature; and
surface an alert indication, using alert indication generator logic, on a user interface, the alert indication comprising an indication of the identified feature.

Example 13 is the computing system of any or all previous examples, wherein the instructions are further configured to cause the support data generation system to:
store, using support request parsing logic an indication of the received support request.

Example 14 is the computing system of any or all previous examples, wherein the instructions are further configured to cause the support data generation system to:
store, using support request parsing logic, an indication of the identified keyword.

Example 15 is the computing system of any or all previous examples, wherein the instructions are further configured to cause the support data generation system to:
detect, using keyword accumulator logic, a trend comprising the keyword increasing in received support requests over time.

Example 16 is the computing system of any or all previous examples, wherein the feature flight is one of a plurality of feature flights undergoing deployment, and wherein identifying the feature comprises identifying the feature flight.

Example 17 is the computing system of any or all previous examples, wherein the support data generation system, in response to a received support request, is configured to automatically analyze the received support request, identify a feature, and surface the identified feature.

Example 18 is a method of formatting a feature flight comprising:
generating an iteration of the feature flight comprising a feature and a deployment scope;
generating a customer scenario associated with the feature, using scenario mapping logic, wherein the customer scenario is configured to be associated with the feature, when detected by a support data generation system; and
generating a keyword associated with the customer scenario, wherein the keyword is generated by a processor utilizing keyword accumulator logic such that it is associated with the customer scenario when detected.

Example 19 is the method of any or all previous examples, wherein generating the keyword comprises automatically generating the keyword using keyword generator logic, and associating with the feature, based on the customer scenario.

Example 20 is the method of any or all previous examples, wherein generating the keyword comprises generating a countable keyword such that keyword accumulator logic can count instances of the keyword over time.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
at least one processor; and
memory storing instructions executable by the at least one processor, wherein the instructions, when executed, provide:
a support data generation system configured to communicate with a data source and to receive a support request; and
support request parsing logic configured to parse the received support request and identify a keyword after the support request is received;
a flight tracker configured to:
identify a feature within a feature flight based on a detected association between the identified keyword and the feature, the feature flight comprising an iteration of feature deployment in a cloud computing environment;
alert indication generator logic configured to surface an alert indication on a user interface, the alert indication comprising an indication of the identified feature; and keyword accumulator logic configured to detect a trend comprising the keyword increasing in received support requests over time.

2. The computing system of claim 1, wherein the support request parsing logic is configured to store an indication of the received support request.

3. The computing system of claim 1, wherein the support request parsing logic is configured to store an indication of the identified keyword.

4. The computing system of claim 1, wherein the feature flight is one of a plurality of feature flights undergoing deployment in a cloud computing environment, and wherein the flight tracker is configured to identify the feature flight within the plurality of feature flights.

5. The computing system of claim 1, wherein the support data generation system is configured to:
in response to the received support request, automatically analyze the received support request using support request parsing logic, identify the feature using the flight tracker, and surface the identified feature using alert indication generator logic.

6. A computing system comprising:
at least one processor; and
memory storing instructions executable by the at least one processor, wherein the instructions, when executed, cause the computing system to:
receive an indication of a detected issue within a flighted infrastructure that deploys features in a cloud computing environment in a plurality of iterations of feature flights;
identify, based on the indication, a feature undergoing implementation within the flighted infrastructure, wherein identification occurs automatically after the indication is detected;
detect that the indication is greater than a threshold comprising at least one of:
a maximum number of keywords associated with the feature, or
a number of support requests associated with the feature:
generate an alert comprising the indication and the identified feature; and
surface the generated alert on a user interface.

7. The computing system of claim 6, wherein the indication comprises a support request, and the instructions cause the computing system to:
detect a previously-defined keyword in the support request.

8. The computing system of claim 6, wherein the indication comprises a support request, and the instructions configure the computing system to:
detect a previously-defined customer scenario based on the support request.

9. The computing system of claim 6, wherein the instructions cause the computing system to:
detect an issue by automatically parsing a received support request for the indication of the issue.

10. The computing system of claim 6, wherein the instructions cause the computing system to:
identify that the feature is associated with one or more of the feature flights undergoing implementation within the flighted infrastructure.

11. The computing system of claim 9, wherein the instructions cause the computing system to:
determine that the detected issue is associated with one or more of iterations of the feature flights.

12. The computing system of claim 11, wherein the instructions cause the computing system to:
determine that the detected issue is associated with a scope.

13. The computing system of claim 6, wherein the threshold comprises a maximum number of keywords associated with the feature.

14. The computing system of claim 6, wherein the threshold comprises a number of support requests associated with the feature.

15. The computing system of claim 6, wherein the Instructions cause the computing system to detect a trend indicating that a number of support requests associated with the feature is increasing over time.

16. A method performed by a computing system, the method comprising:
generating an iteration of a feature flight comprising an iteration of feature deployment in a cloud computing environment, the feature flight including a feature and a deployment scope;
generating a customer scenario associated with the feature using scenario mapping logic, wherein the customer scenario is configured to be associated with the feature when detected by a support data generation system; and
generating a keyword associated with the customer scenario, wherein the keyword is generated by a processor utilizing keyword generator logic such that it is associated with the customer scenario when detected, wherein generating the keyword comprises generating a countable keyword such that keyword accumulator logic can count instances of the keyword over time.

17. The method of claim 16, wherein generating the keyword comprises automatically generating the keyword using keyword generator logic, and associating the keyword with the feature, based on the customer scenario.

* * * * *